US010752357B2

(12) United States Patent
von Flotow et al.

(10) Patent No.: US 10,752,357 B2
(45) Date of Patent: Aug. 25, 2020

(54) ROTORCRAFT-ASSISTED SYSTEM AND METHOD FOR LAUNCHING AND RETRIEVING A FIXED-WING AIRCRAFT INTO AND FROM FREE FLIGHT

(71) Applicant: Hood Technology Corporation, Hood River, OR (US)

(72) Inventors: Andreas H. von Flotow, Hood River, OR (US); Corydon C. Roeseler, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 531 days.

(21) Appl. No.: 15/458,404

(22) Filed: Mar. 14, 2017

(65) Prior Publication Data

US 2017/0274997 A1    Sep. 28, 2017

Related U.S. Application Data

(60) Provisional application No. 62/311,772, filed on Mar. 22, 2016.

(51) Int. Cl.
*B64D 5/00*     (2006.01)
*B64C 27/08*    (2006.01)

(52) U.S. Cl.
CPC .............. *B64D 5/00* (2013.01); *B64C 27/08* (2013.01)

(58) Field of Classification Search
CPC ........................................................ B64D 5/00
See application file for complete search history.

(56) References Cited

U.S. PATENT DOCUMENTS

| | | |
|---|---|---|
| 968,339 A | 8/1910 | Geraldson |
| 1,144,505 A | 6/1915 | Steffan |
| 1,306,860 A | 6/1919 | Smith |
| 1,383,595 A | 7/1921 | Black |
| 1,499,472 A | 7/1924 | Pratt |
| 1,582,188 A | 4/1926 | Mummert |
| 1,625,020 A | 4/1927 | Guillermo |
| 1,686,298 A | 10/1928 | Uhl |
| 1,716,670 A | 6/1929 | Sperry |
| 1,731,091 A | 10/1929 | Clayton |
| 1,748,663 A | 2/1930 | Tucker |
| 1,836,010 A | 12/1931 | Audrain |
| 1,848,828 A | 3/1932 | Griffin |
| 1,912,723 A | 6/1933 | Perkins |
| 2,415,071 A | 2/1947 | Brie |

(Continued)

FOREIGN PATENT DOCUMENTS

| | | |
|---|---|---|
| CA | 781808 | 4/1968 |
| CA | 839101 | 4/1970 |

(Continued)

OTHER PUBLICATIONS

AVIASTAR, "Bell QTR Quad Tiltrotor", Jul. 27, 2015 (13 pages).

(Continued)

*Primary Examiner* — Reginald S Tillman, Jr.
(74) *Attorney, Agent, or Firm* — Neal, Gerber & Eisenberg LLP

(57) ABSTRACT

The present disclosure provides various embodiments of a rotorcraft-assisted launch and retrieval system including a rotorcraft having a fixed-wing aircraft capture assembly configured to capture a fixed-wing aircraft.

6 Claims, 11 Drawing Sheets

(56) References Cited

U.S. PATENT DOCUMENTS

| | | |
|---|---|---|
| 2,435,197 A | 2/1948 | Brodie |
| 2,440,574 A | 4/1948 | Cotton |
| 2,448,209 A | 8/1948 | Boyer et al. |
| 2,488,050 A | 11/1949 | Brodie |
| 2,488,051 A | 11/1949 | Brodie |
| 2,552,115 A | 5/1951 | Replogle |
| 2,807,429 A | 9/1957 | Hawkins, Jr. et al. |
| 2,843,337 A | 7/1958 | Bennett |
| 2,944,815 A | 7/1960 | Moyer |
| 3,017,138 A | 1/1962 | Flint |
| 3,029,049 A | 4/1962 | Melville |
| 3,146,974 A | 9/1964 | Petoia |
| 3,351,325 A | 11/1967 | Cotton |
| 3,389,880 A | 6/1968 | Ferguson |
| 3,785,316 A | 1/1974 | Leming et al. |
| 3,980,259 A | 9/1976 | Greenhalgh et al. |
| 4,079,901 A | 3/1978 | Mayhew et al. |
| 4,116,408 A | 9/1978 | Soloy |
| 4,123,020 A | 10/1978 | Korsak |
| 4,147,317 A | 4/1979 | Mayhew et al. |
| 4,267,987 A | 5/1981 | McDonnell |
| 4,311,290 A | 1/1982 | Koper |
| 4,523,729 A | 6/1985 | Frick |
| 4,575,026 A | 3/1986 | Brittain et al. |
| 4,680,962 A | 7/1987 | Durbin |
| 4,753,400 A | 6/1988 | Reuter et al. |
| 4,757,959 A | 7/1988 | Schroder et al. |
| 4,790,497 A | 12/1988 | Yoffe |
| 4,842,222 A | 6/1989 | Baird |
| 4,860,972 A * | 8/1989 | Lannerd ............ B64D 37/04 244/135 R |
| 5,000,398 A | 3/1991 | Rashev |
| 5,039,034 A | 8/1991 | Burgess et al. |
| 5,042,750 A | 8/1991 | Winter |
| 5,054,717 A | 10/1991 | Taylor |
| 5,092,540 A | 3/1992 | Burgess et al. |
| 5,687,930 A | 11/1997 | Wagner et al. |
| 5,799,900 A | 9/1998 | McDonnell |
| 5,806,795 A | 9/1998 | Ortelli |
| 6,264,140 B1 | 7/2001 | McGeer et al. |
| 6,824,102 B2 | 11/2004 | Haggard |
| 6,874,729 B1 | 4/2005 | McDonnell |
| 6,961,018 B2 | 11/2005 | Heppe et al. |
| 7,000,883 B2 | 2/2006 | Mercadal et al. |
| 7,028,947 B2 | 4/2006 | Burns |
| 7,059,564 B2 | 6/2006 | Dennis |
| 7,066,430 B2 | 6/2006 | Dennis et al. |
| 7,090,166 B2 | 8/2006 | Dennis et al. |
| 7,097,137 B2 | 8/2006 | McDonnell |
| 7,104,495 B2 | 9/2006 | McGeer |
| 7,114,680 B2 | 10/2006 | Dennis |
| 7,121,507 B2 | 10/2006 | Dennis et al. |
| 7,128,294 B2 | 10/2006 | Roeseler et al. |
| 7,140,575 B2 | 11/2006 | McGeer et al. |
| 7,143,974 B2 | 12/2006 | Roeseler et al. |
| 7,143,976 B2 | 12/2006 | Snediker et al. |
| 7,152,827 B2 | 12/2006 | McGeer |
| 7,165,745 B2 | 1/2007 | McGeer et al. |
| 7,175,135 B2 | 2/2007 | Dennis et al. |
| 7,219,856 B2 | 5/2007 | Watts et al. |
| 7,264,204 B1 | 9/2007 | Portmann |
| 7,344,108 B2 | 3/2008 | Muylaert et al. |
| 7,360,741 B2 | 4/2008 | McGeer et al. |
| 7,410,125 B2 | 8/2008 | Steele |
| 7,464,650 B2 | 12/2008 | Steinkerchner et al. |
| 7,510,145 B2 | 3/2009 | Snediker |
| 7,530,527 B2 | 5/2009 | Kelleher |
| 7,543,780 B1 | 6/2009 | Marshall et al. |
| 7,562,843 B2 | 7/2009 | Lipponen |
| 7,578,467 B2 | 8/2009 | Goodrich |
| 7,581,702 B2 | 9/2009 | Olson et al. |
| 7,602,415 B2 | 10/2009 | von Flotow et al. |
| 7,665,691 B2 | 2/2010 | Hanzlick et al. |
| 7,712,702 B2 | 5/2010 | McGeer et al. |
| 7,798,445 B2 | 9/2010 | Heppe et al. |
| 7,806,366 B2 | 10/2010 | Jackson |
| 7,876,359 B2 | 1/2011 | von Flotow et al. |
| 7,883,059 B2 | 2/2011 | Kunz |
| 7,954,758 B2 | 6/2011 | McGeer et al. |
| 8,091,833 B2 | 1/2012 | von Flotow et al. |
| 8,140,200 B2 | 3/2012 | Heppe et al. |
| 8,162,256 B2 | 4/2012 | Goossen |
| 8,172,177 B2 | 5/2012 | Lovell |
| 8,226,039 B2 | 7/2012 | von Flotow et al. |
| 8,231,083 B2 | 7/2012 | Kutzmann et al. |
| 8,245,968 B2 | 8/2012 | McGeer et al. |
| 8,276,844 B2 | 10/2012 | Kariv |
| 8,292,215 B2 | 10/2012 | Olm et al. |
| 8,313,057 B2 | 11/2012 | Rednikov |
| 8,348,193 B2 | 1/2013 | McGeer et al. |
| 8,405,723 B2 | 3/2013 | von Flotow et al. |
| 8,453,966 B2 | 6/2013 | McGeer et al. |
| 8,464,981 B2 | 6/2013 | Goldie et al. |
| 8,573,536 B2 | 11/2013 | McGeer et al. |
| 8,596,576 B1 | 12/2013 | McGeer et al. |
| 8,672,264 B1 | 3/2014 | McGeer et al. |
| 8,708,277 B1 | 4/2014 | McGeer et al. |
| 8,708,278 B2 | 4/2014 | McGeer et al. |
| 8,714,482 B2 | 5/2014 | McGeer et al. |
| 8,740,134 B2 | 6/2014 | Suzuki |
| 8,740,142 B2 | 6/2014 | McGeer et al. |
| 8,944,373 B2 | 2/2015 | Dickson |
| 8,950,698 B1 | 2/2015 | Rossi |
| 8,955,800 B2 | 2/2015 | McGeer et al. |
| 8,955,801 B2 | 2/2015 | McGeer et al. |
| 9,004,402 B2 | 4/2015 | McGeer et al. |
| 9,010,683 B2 | 4/2015 | Gundlach et al. |
| 9,132,916 B2 | 9/2015 | Hanna et al. |
| 9,193,481 B2 | 11/2015 | McGeer et al. |
| 9,266,609 B1 | 2/2016 | Kunz |
| 9,290,269 B2 | 3/2016 | Walker et al. |
| 9,340,301 B2 | 5/2016 | Dickson et al. |
| 9,359,075 B1 | 6/2016 | von Flotow et al. |
| 9,434,481 B2 | 9/2016 | McGeer et al. |
| 9,456,185 B2 | 9/2016 | Oakley et al. |
| 9,685,091 B2 | 6/2017 | Hayes |
| 9,816,816 B2 | 11/2017 | Hayes |
| 9,856,036 B2 | 1/2018 | Dickson et al. |
| 9,896,222 B2 | 2/2018 | Kunz et al. |
| 2002/0100838 A1 | 8/2002 | McGeer et al. |
| 2003/0222173 A1 | 12/2003 | McGeer et al. |
| 2004/0256519 A1 | 12/2004 | Ellis et al. |
| 2005/0017129 A1 | 1/2005 | McDonnell |
| 2010/0025528 A1 | 2/2010 | Jackson |
| 2012/0223182 A1 | 9/2012 | Gilchrist et al. |
| 2014/0117147 A1 | 5/2014 | Hanna et al. |
| 2015/0115096 A1 | 4/2015 | Rossi |
| 2015/0129716 A1 | 5/2015 | Yoffe |
| 2015/0314871 A1 | 11/2015 | von Flotow |
| 2016/0023760 A1 | 1/2016 | Goodrich |
| 2016/0114906 A1 | 4/2016 | McGeer et al. |
| 2016/0221683 A1 | 8/2016 | Roberts et al. |
| 2016/0327945 A1 | 11/2016 | Davidson |
| 2017/0036762 A1* | 2/2017 | Gamble ................ B64C 27/08 |
| 2017/0072812 A1 | 3/2017 | Von Novak et al. |
| 2017/0225784 A1 | 8/2017 | Hayes et al. |
| 2018/0050823 A1 | 2/2018 | McGeer |

FOREIGN PATENT DOCUMENTS

| | | |
|---|---|---|
| CN | 204822072 | 12/2015 |
| EP | 0 472 613 | 4/1992 |
| EP | 2 186 728 | 5/2010 |
| GB | 2 071 031 | 9/1981 |
| WO | WO 01/07318 | 2/2001 |
| WO | WO 2008/015663 | 2/2008 |
| WO | WO 2013/171735 | 11/2013 |

(56) References Cited

FOREIGN PATENT DOCUMENTS

| WO | WO 2014/204550 | 12/2014 |
| WO | WO 2016/167849 | 10/2016 |

OTHER PUBLICATIONS

United States Patent and Trademark Office, Acting as the International Searching Authority, International Search Report and Written Opinion in PCT/US2017/022482 dated Jan. 11, 2018 (11 pages).
"Trapeze" Wikipedia, Aug. 4, 2006, available at http://en.wikipedia.org/w/index.php?title=Trapeze&oldid=67584367.
A miniature powerplant for very small, very long range autonomous aircraft, S.P. Hendrickson and T. McGeer, Final Report under U.S. DoE contract No. DE-FG03-96ER82187, Sep. 1999, (25 pp.).
Aerosonde hazard estimation, T. McGeer, 1994, (6 pp).
Aerosonde Pacific reconnaissance: ready when you are!, T. McGeer, Pacific Northwest Weather Workshop, Mar. 2005, (15 pp).
An Airspeed Vector Sensor for V/STOL Aircraft, E. J. Durbin and T. McGeer, Journal of Aircraft, vol. 19 No. 6, Jun. 1982, (7 pp).
Automated Launch, Recovery, and Refueling for Small Unmanned Aerial Vehicles, K. Mullens et al., 2004 (11 pp).
Autonomous Aerosondes for Economical Atmospheric Soundings Anywhere on the Globe, G. J. Holland, T. McGeer and H.H. Youngre, Bulletin of the American Meteorological Society, vol. 73 No. 12, Dec. 1992 (12 pp).
Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).
Laima: The First Atlantic Crossing by Unmanned Aircraft, T. McGeer, Feb. 1999, (25 pp).
Mini-RPV Recovery System Conceptual Study, Prepared for Eustis Directorate U.S. Army Air Mobility Research and Development Laboratory, Aug. 1977 (322 pages).
Quantitative Risk Management as a Regulatory Approach to Civil UAVs, T. McGeer, L. Newcombe, and J. Vagners, International Workshop on UAV Certification, Jun. 1999, (11 pp).
Regulatory Issues Involving Long-Range Weather Observation by Aerosonde Autonomous Aircraft, T. McGeer, Oct. 1998, (8 pp).
Rotary Action, description of scene of License to Kill, available at http://www.rotaryaction.com/pages/licetkil.html (2 pp).
Safety, Economy, Reliability and Regulatory Policy of Unmanned Aircraft, T. McGeer, Mar. 2007, (9 pp).
Skyhook (Harrier handling system); Harpoon Head Quarters; available at http://www.harpoondatabases.com/encyclopedia/Entry2979.aspx; printed Jun. 21, 2013 (3 pages).
The Beartrap—A Canadian Invention, Crowsnest Magazine, vol. 17, No. 3 and 4 [online], Mar.-Apr. 1965, [retrieved on Sep. 14, 2007]. Retrieved from the Internet at <URL: http://www.readyayeready.com/timeline/1960s/beartrap/index.htm>. (4 pp).
Wide-Scale Use of Long-Range Miniature Aerosondes Over the World's Oceans, T. McGeer and J. Vagners, 1999, (25 pp).

\* cited by examiner

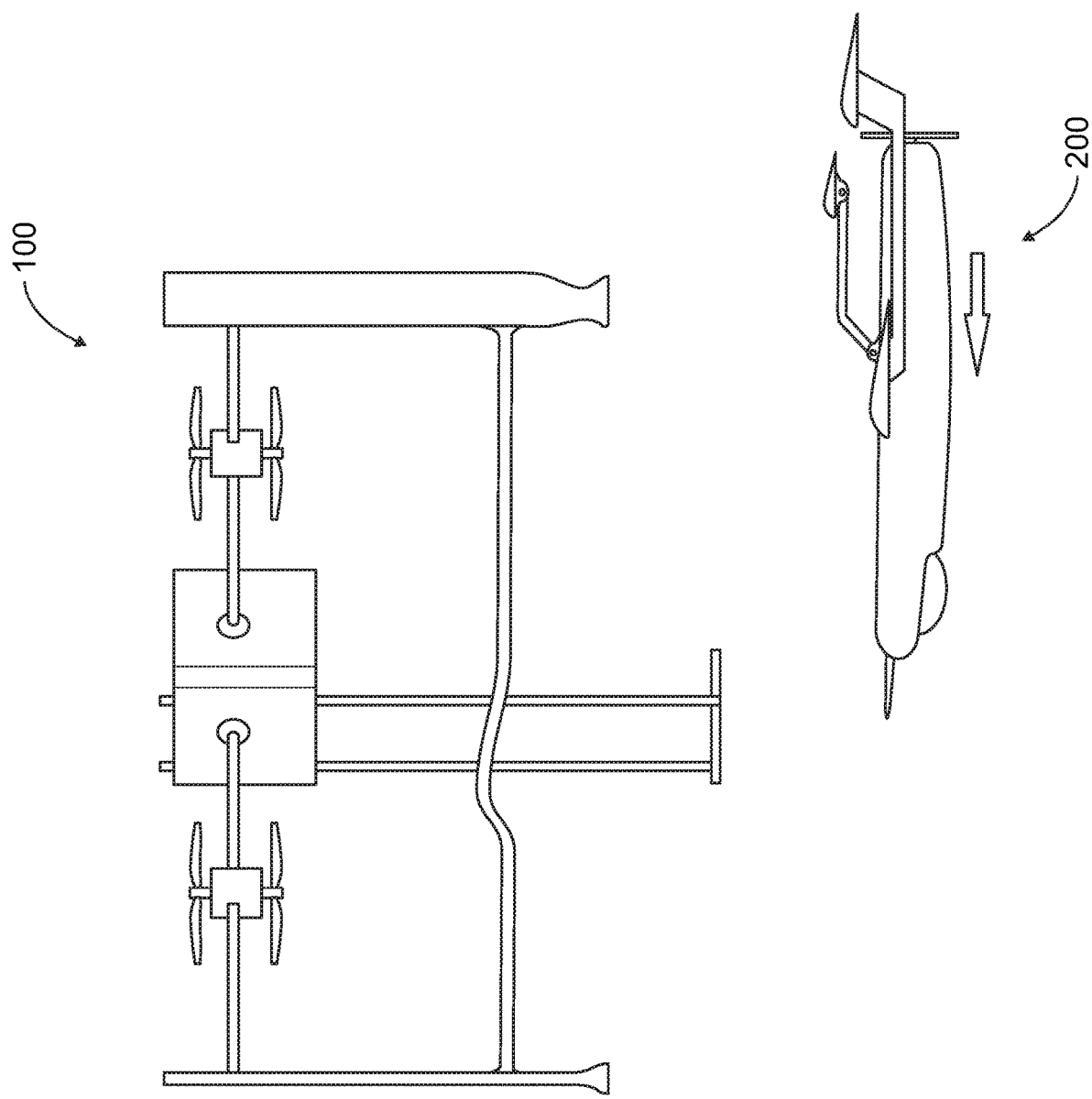

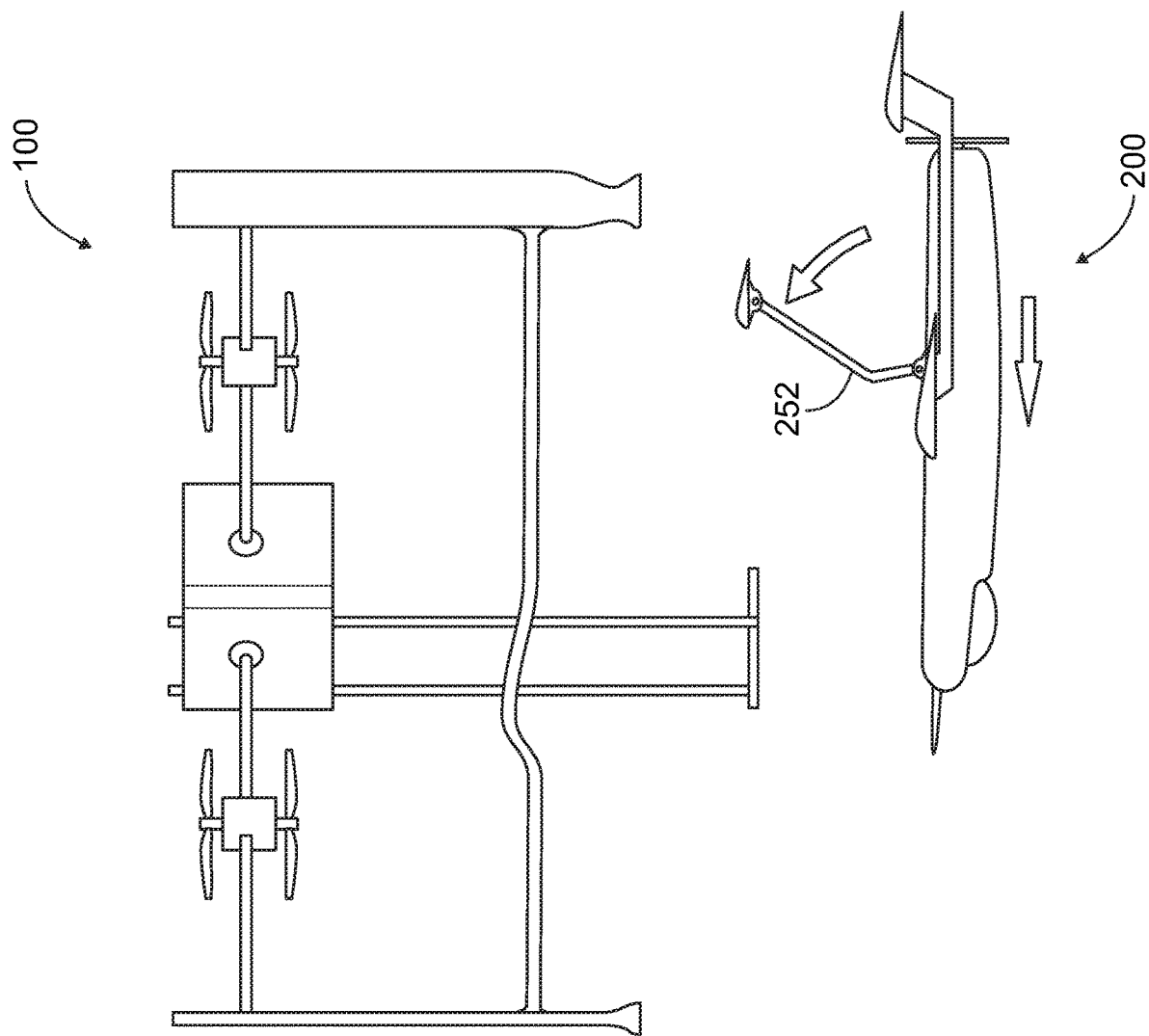

ROTORCRAFT-ASSISTED SYSTEM AND METHOD FOR LAUNCHING AND RETRIEVING A FIXED-WING AIRCRAFT INTO AND FROM FREE FLIGHT

PRIORITY CLAIM

This patent application claims priority to and the benefit of U.S. Provisional Patent Application No. 62/311,772, which was filed on Mar. 22, 2016, the entire contents of which are incorporated herein by reference.

FIELD

The present disclosure relates to systems and methods for launching and retrieving a fixed-wing aircraft into and from free flight. More particularly, the present disclosure relates to rotorcraft-assisted systems and methods for launching and retrieving a fixed-wing aircraft into and from free flight.

BACKGROUND

An aircraft capable of hover and/or of slow flight is typically not well-suited to long-distance, efficient cruising flight. Certain fixed-wing aircraft are capable of long-distance, efficient cruising flight, but typically require long runways for takeoff and landing. When there isn't sufficient space for a runway, these fixed-wing aircraft may not be used.

While certain known aircraft-launch and/or retrieval systems and methods have eliminated the need for a runway to launch and/or retrieve a fixed-wing aircraft, they have several drawbacks.

Certain known aircraft-launch systems and methods employ a pneumatic catapult launcher to launch a fixed-wing aircraft into free flight without using a runway. These pneumatic catapult launchers include a launch carriage that runs along a track. Before launch, an operator angles the track relative to the ground to obtain a desired launch trajectory and mounts the fixed-wing aircraft to the launch carriage. The pneumatic catapult launcher accelerates and then decelerates the launch carriage along the track to eject the fixed-wing aircraft from the launch carriage, thereby launching the fixed-wing aircraft into free flight.

While these pneumatic catapult launchers are proven launch solutions that are mobile, versatile, and built for harsh environments, they have some drawbacks. These pneumatic catapult launchers can only be used in areas in which they can be positioned so the trajectory of the fixed-wing aircraft after launch clears any obstacles. For instance, they cannot be used to launch fixed-wing aircraft in heavily wooded or urban areas. These pneumatic catapult launchers are also relatively large, heavy, and cumbersome compared to the fixed-wing aircraft, which increases transportation costs and difficulty.

One known aircraft-launch and retrieval system and method, which is disclosed in U.S. Pat. No. 2,843,337 to Bennett, employs a rotary-wing aircraft to launch a fixed-wing aircraft into free flight and to retrieve the fixed-wing aircraft from free flight without using a runway. To launch the fixed-wing aircraft into free flight, the rotary-wing aircraft stiffly mates to the fixed-wing aircraft via insertion of four balls mounted atop the fixed-wing aircraft into corresponding socket structures mounted to the rotary-wing aircraft. The rotary-wing aircraft then hoists the fixed-wing aircraft, accelerates to a desired airspeed, and releases the fixed-wing aircraft into free flight. To retrieve the fixed-wing aircraft from free flight, the rotary-wing aircraft matches the airspeed of the fixed-wing aircraft, stiffly mates with the fixed-wing aircraft in midair, decelerates, and carries the fixed-wing aircraft to a desired landing area.

The Bennett aircraft-launch and retrieval system and method is impractical. Regarding launch, releasing the fixed-wing aircraft into free flight requires a perfectly synchronized release of the four balls from their corresponding socket structures. An imperfectly synchronized release will impart a pitch or roll rate to the fixed-wing aircraft as the rotary-wing aircraft releases it into free flight. Releasing some but not all of the balls from their corresponding sockets could be catastrophic, possibly resulting in the destruction of either aircraft.

Regarding retrieval, mating the four balls to their corresponding socket structures in midair requires extreme precision and dramatically increases the relative position requirements of the autopilot. The rotary-wing aircraft must match the fixed-wing aircraft's airspeed, align each socket structure above its corresponding ball, and decrease its altitude such that each socket structure receives and secures its corresponding ball. Improperly performing even part of one of these steps could result in retrieval failure or worse: damage to either aircraft. Retrieval becomes even more complex in adverse weather conditions, such as rain or high winds, in which aircraft movement becomes even more imprecise and unpredictable.

One known aircraft-retrieval system and method employs a retrieval rope suspending apparatus that suspends a retrieval rope to retrieve the fixed-wing aircraft from free flight without using a runway. The retrieval rope suspending apparatus is anchored to (or due to its weight, effectively anchored to) the ground and vertically suspends the retrieval rope. The fixed-wing aircraft is flown toward the retrieval rope such that the leading edge of one of the wings of the fixed-wing aircraft contacts the retrieval rope. Afterwards, continued movement of the fixed-wing aircraft relative to the retrieval rope causes the retrieval rope to slide away from the fuselage of the fixed-wing aircraft along the leading edge of the wing toward the wingtip until a rope capture device (such as a cleat) near the wingtip captures the retrieval rope. Rope deflection combined with a damping force imposed by a damping element slows the fixed-wing aircraft, which is then lowered to the ground.

This known aircraft-retrieval system and method is robust and has proven success in a wide range of conditions (such as in gusty winds) and for fixed-wing aircraft having autopilots with imperfect tracking. This known aircraft-retrieval system and method owes its success in part to a large, sweeping crosshair forming a large capture target area. The leading edge of the fixed-wing aircraft's wing forms the horizontal axis of the crosshair, and the retrieval rope forms the vertical axis of the crosshair.

While a proven solution in certain situations, this known aircraft-retrieval system and method has certain drawbacks. Using a ground-anchored retrieval rope limits applications to those with clear space in the vicinity of the ground anchor. Global Positioning System (GPS) reception may be denied at some retrieval locations, rendering GPS-assisted retrieval impossible. Further, if low-altitude retrieval is desired, such as retrieval in a canyon or a wooded area, options for wave-off may be limited, thereby limiting the ability to abort retrieval. Also, the retrieval rope may get snagged on surrounding obstacles, which could lead to fixed-wing aircraft damage or destruction. Additionally, operators must take care to avoid structural overload on the fixed-wing aircraft since a stationary object (the ground-anchored retrieval rope) arrests its motion. Another disadvantage is that after the fixed-wing aircraft captures the retrieval rope, the fixed-wing aircraft dangles from the retrieval rope by one wingtip. Operators must exercise much care to avoid damaging the fixed-wing aircraft, as it can begin to swing like a wrecking ball as operators lower it to the ground. Further, for large fixed-wing aircraft, sophisticated ground-handling equipment would be needed to right the fixed wing aircraft as it is lowered to the ground. For covert operations, the retrieval rope suspending apparatus could reveal the location of the base of operations, defeating the purpose of the covert operation.

There is a need for new systems and methods by which fixed-wing aircraft may be launched and retrieved without using a runway that solve these problems.

SUMMARY

The present disclosure provides a rotorcraft-assisted launch and retrieval system and method and a rotorcraft-assisted retrieval system that remedy the above-described drawbacks. More specifically, various embodiments of the present disclosure include large swept target areas for practical docking of one flying aircraft onto another without the limitations associated with a long tether and ground anchor when performing airborne recovery of a fixed-wing aircraft.

Various embodiments of the rotorcraft-assisted launch and retrieval system of the present disclosure include a multicopter including a fixed-wing aircraft capture assembly sized, shaped, or otherwise configured to capture—and later release—part of a capture-arm assembly of a fixed-wing aircraft. The capture assembly includes a tapered capture throat that defines a longitudinal swept surface. To retrieve the fixed-wing aircraft from free flight, a capture arm of the fixed-wing aircraft is first rotated such that it extends upward from the fuselage. The fixed-wing aircraft is flown toward the multicopter until the capture throat receives the capture arm and a locking device locks the capture arm in place. This links the two aircraft together. The fixed-wing aircraft may then be raised toward the multicopter (such as by raising the arms that define the capture throat) until the wings of the fixed-wing aircraft engage wing engagers of the multicopter to at least partially stabilize the fixed-wing aircraft in pitch, yaw, and roll. To launch the fixed-wing aircraft into free flight, the process is reversed.

Various embodiments of the rotorcraft-assisted retrieval system of the present disclosure include a multicopter including a fixed-wing aircraft capture assembly sized, shaped, or otherwise configured to capture a fixed-wing aircraft. Some embodiments involve modifications to existing fixed-wing aircraft to facilitate multicopter-assisted launch and retrieval, while others do not. One embodiment of the capture assembly defines two spaced apart, downwardly-angled wing-capture throats. To retrieve the fixed-wing aircraft from free flight, the fixed-wing aircraft is flown toward the capture assembly such that the wings of the fixed-wing aircraft enter the respective wing-capture throats. Since the wing-capture throats are angled downward, the fixed-wing aircraft is forced to pitch downward, and gravity maintains the fixed-wing aircraft in this position.

Additional features and advantages of the present disclosure are described in, and will be apparent from, the following Detailed Description and the Figures.

BRIEF DESCRIPTION OF THE FIGURES

FIGS. 3A, 3B, 3C, and 3D are diagrammatic views showing the multicopter of FIG. 1 capturing the fixed-wing aircraft of FIG. 2.

DETAILED DESCRIPTION

Figure 1A:
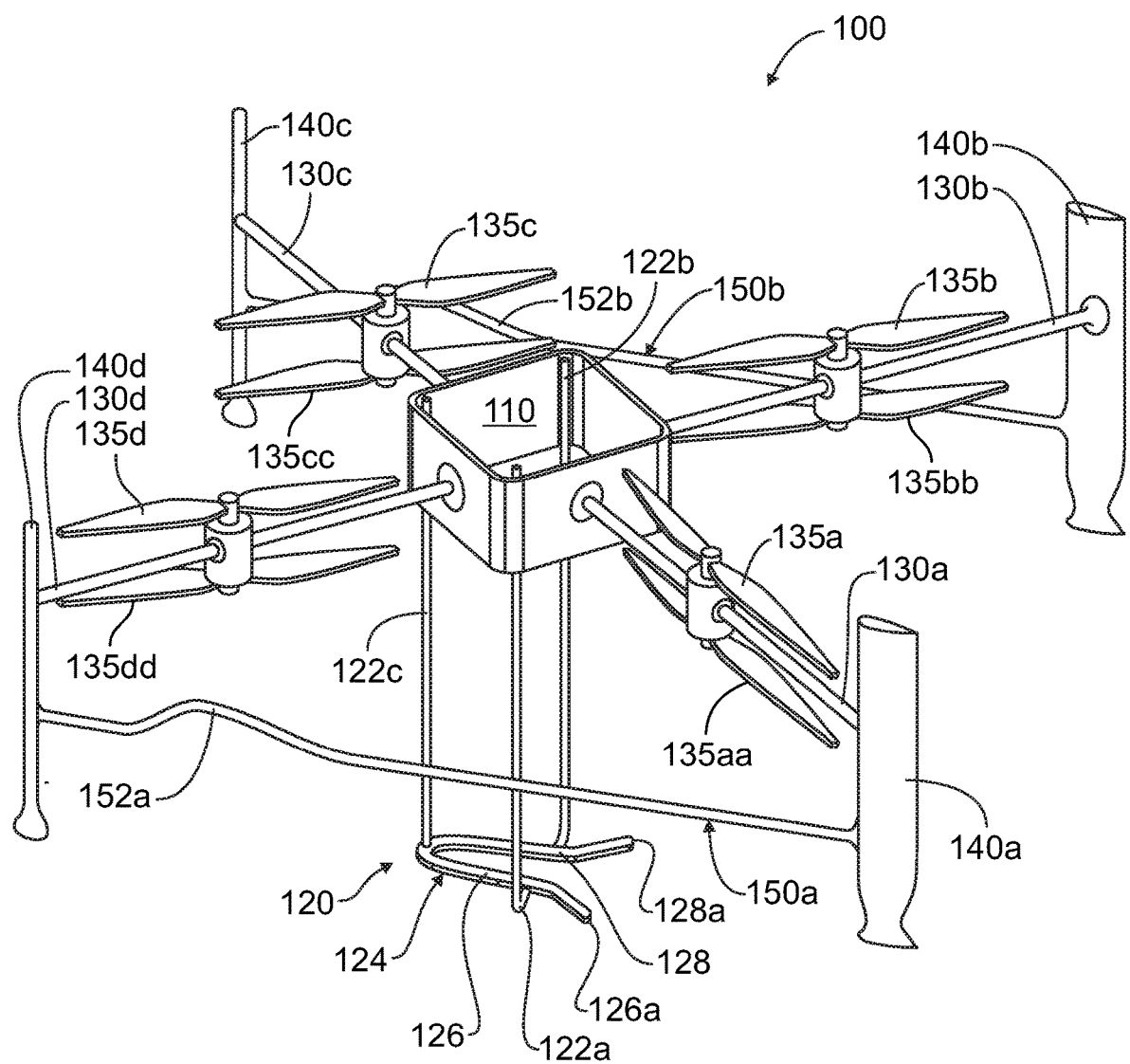
FIG. 1A is a top perspective view of one example embodiment of the multicopter of the present disclosure including one embodiment of a fixed-wing aircraft capture assembly.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

One embodiment of the rotorcraft-assisted fixed-wing aircraft-launch and retrieval system and method of the present disclosure includes a multicopter 100 including a fixed-wing aircraft capture assembly 120 sized, shaped, or otherwise configured to capture—and later release—part of a capture-arm assembly 250 of a fixed-wing aircraft 200.

The components of the example embodiment of the multicopter 100 are described in association with FIGS. 1A and 1B and the components of the fixed-wing aircraft 200 are described below in association with FIG. 2, followed by a description of example methods for retrieving and launching the fixed-wing aircraft 200 from and into from free flight using the multicopter 100 in association with FIGS. 3A to 3D.

Although the system and method are described with respect to a multicopter and a fixed-wing aircraft, the multicopter may be replaced with any suitable aircraft (such as any suitable rotorcraft) having powered-lift and vertical launch and recovery capability, and the fixed-wing aircraft may be replaced with any suitable aircraft (such as aircraft having long-range endurance). Either or both may be manned or unmanned.

Figure 1B:
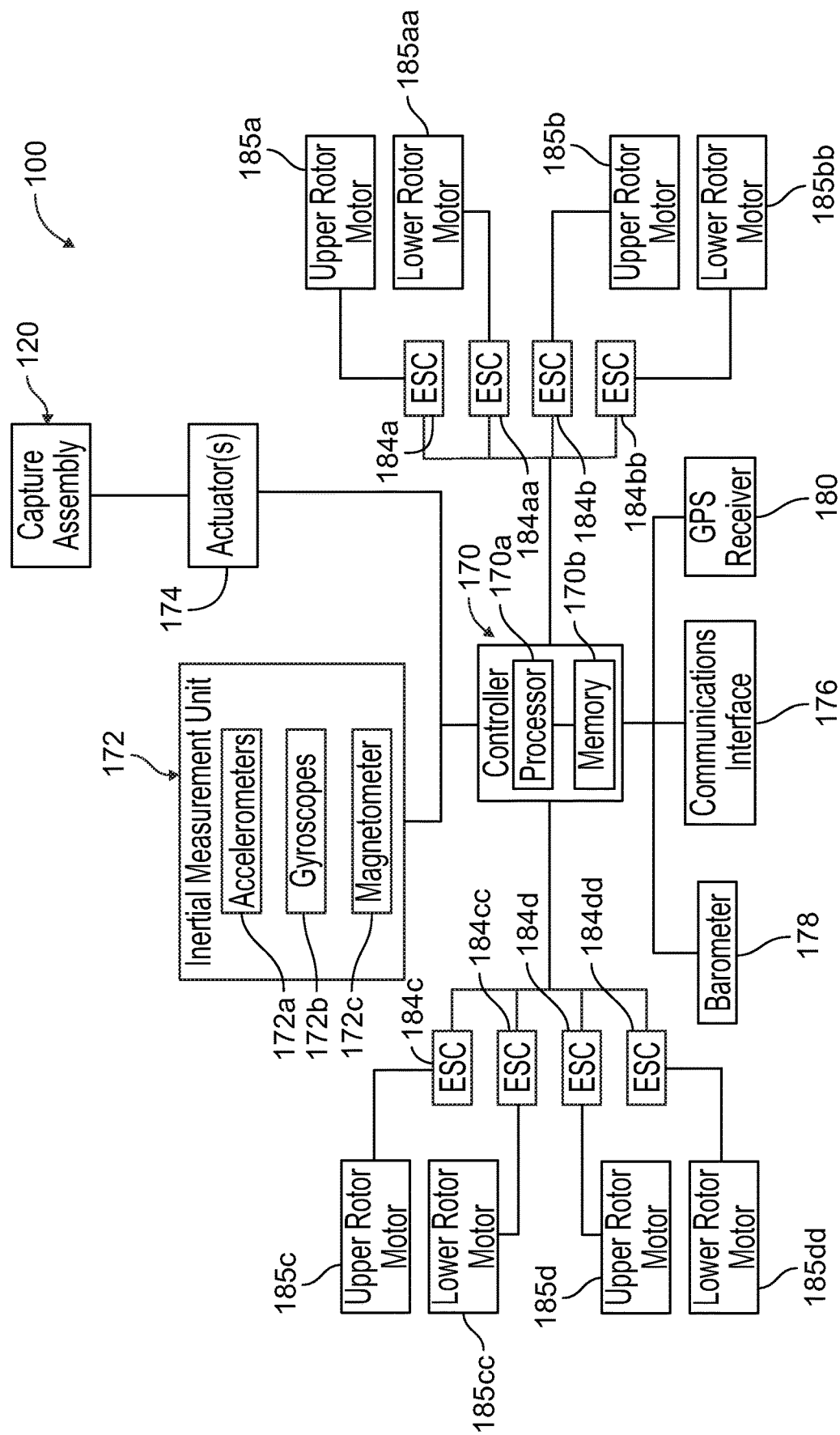
FIG. 1B is a block diagram showing certain electrically-controlled components of the multicopter of FIG. 1A.

FIGS. 1A and 1B show the multicopter 100, which includes: (1) a hub or body 110; (2) the fixed-wing aircraft capture assembly 120 (sometimes referred to as the "capture assembly"); (3) first, second, third, and fourth rotor arms 130a, 130b, 130c, and 130d; (4) first, second, third, and fourth upper rotors 135a, 135b, 135c, and 135d respectively supported by the first, second, third, and fourth rotor arms 130a-130d; (5) first, second, third, and fourth upper rotor motors 185a, 185b, 185c, and 185d respectively supported by the first, second, third, and fourth rotor arms 130*a*-130*d* and respectively drivingly engaged to the first, second, third, and fourth upper rotors 135*a*, 135*b*, 135*c*, and 135*d*; (6) first, second, third, and fourth lower rotors 135*aa*, 135*bb*, 135*cc*, and 135*dd* respectively supported by the first, second, third, and fourth rotor arms 130*a*-130*d*; (7) first, second, third, and fourth lower rotor motors 185*aa*, 185*bb*, 185*cc*, and 185*dd* respectively supported by the first, second, third, and fourth rotor arms 130*a*-130*d* and respectively drivingly engaged to the first, second, third, and fourth lower rotors 135*aa*, 135*bb*, 135*cc*, and 135*dd*; (8) first and second rear landing gear 140*a* and 140*b*; (9) first and second front landing gear 140*c* and 140*d*; (10) first and second wing engagers 150*a* and 150*b*; (11) a controller 170; (12) an inertial measurement unit (IMU) 172; (13) an actuator or actuators 174; (14) a communications interface 176; (15) a barometer 178 (or other suitable pressure sensor); (16) a GPS receiver 180; and (17) eight electronic speed controllers (ESCs) 184*a*, 184*aa*, 184*b*, 184*bb*, 184*c*, 184*cc*, 184*d*, and 184*dd*.

The controller 170 is electrically and communicatively connected to the IMU 172, the actuator(s) 174, the communications interface 176, the barometer 178, the GPS receiver 180, and the ESCs 184*a*-184*dd*.

The controller 170 includes a processor 170*a* and a memory 170*b*. The processor 170*a* is configured to execute program code or instructions stored in the memory 170*b* to control operation of the multicopter 100, as described herein. The processor 170*a* may be one or more of: (1) a general-purpose processor; (2) a content-addressable memory; (3) a digital-signal processor; (4) an application-specific integrated circuit; (5) a field-programmable gate array; (6) any suitable programmable logic device, discrete gate, or transistor logic; (7) discrete hardware components; and (8) any other suitable processing device.

The memory 170*b* is configured to store, maintain, and provide data as needed to support the functionality of the multicopter 100. For instance, in various embodiments, the memory 170*b* stores program code or instructions executable by the processor 170*a* to control the multicopter 100. The memory 170*b* may be any suitable data storage device, such as one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); and (4) read-only memory.

The communications interface 176 is a suitable wireless communication interface, such as a transceiver like an MM2 900 MHz Embedded Radio by Freewave Technologies, configured to establish and facilitate communication between the controller 170 and: (1) a computing device (such as a laptop computer, a tablet computer, or a mobile phone, not shown); and (2) an R/C controller (not shown) that the operator of the multicopter 100 controls. In operation, once the communications interface 176 establishes communication with the computing device, the controller 170 can send data (via the communications interface 176) associated with the operation of the multicopter 100 (such as the operational status of the multicopter 100, GPS coordinates of the multicopter 100, rotor motor status, IMU or other sensor measurements, altitude, GPS reception health, magnetometer health, aircraft attitude, and the like) to the computing device. Once the communications interface 176 establishes communication with the R/C controller, the controller 170 can receive signals (via the communications interface 176) from the R/C controller. More specifically, upon receipt of these signals from the R/C controller, the communications interface 176 converts these signals into a format readable by the controller 170 and sends the converted signals to the controller 170 for processing.

The above-described communication may be bidirectional or unidirectional. In some embodiments, the communications interface 176 enables the controller 170 to send data to the computing device but not receive data from the computing device. In other embodiments, the communications interface 176 enables the controller 170 to send data to the computing device and to receive data from the computing device. In some embodiments, the communications interface 176 enables the controller 170 to receive signals from the R/C controller but not send signals to the R/C controller. In other embodiments, the communications interface 176 enables the controller 170 to receive signals from the R/C controller and send signals to the R/C controller.

In certain embodiments, the communications interface 176 includes separate components for communicating with the computing device (such as a telemetry link) and the R/C controller (such as an R/C receiver).

The IMU 172 includes: (1) multiple accelerometers 172*a* configured to sense the linear acceleration of the multicopter 100 with respect to three orthogonal reference axes (e.g., standard orthogonal x-, y-, and z-axes); (2) multiple gyroscopes 172*b* configured to sense the angular rotation of the multicopter 100 with respect to the pitch, yaw, and roll axes of the multicopter 10; and (3) a magnetometer 172*c* configured to enable the controller 170 to determine the heading of the multicopter 100 (i.e., the direction in which the multicopter 100 is pointed relative to Earth). More specifically, the magnetometer 172*c* is configured to sense the Earth's magnetic field and transmit a signal representing the direction of the Earth's magnetic North to the controller 170. The controller 170 is configured to use the GPS coordinates of the multicopter 100 and a global map of declination angle (the angle between the Earth's true North and the Earth's magnetic North) to determine a required correction angle. The controller 170 is configured to apply the required correction angle to the direction of the Earth's magnetic North to obtain the direction of the Earth's true North. The controller 170 then uses this information to determine the heading of the multicopter 100. In other embodiments, a pair of GPS receivers are used instead of the magnetometer to maintain more accurate heading. This practice is especially useful when the multicopter is operating in close proximity to large iron objects—such as ship hulls—or when the difference between the Earth's magnetic North and true North is large, such as near the Earth's poles.

The accelerometers 172*a*, the gyroscopes 172*b*, and the magnetometer 172*c* continuously or periodically obtain these sensor readings and continuously or periodically transmit corresponding signals to the controller 170, which uses these sensor readings in a variety of different ways described herein. This is merely one example IMU, and the IMU may include any suitable sensors.

The barometer 178 is configured to sense the atmospheric pressure and to transmit a signal representing the sensed atmospheric pressure to the controller 170. The controller 170 is configured to use the sensed atmospheric pressure to determine: (1) the height of the multicopter 100 above sea level; and (2) the height of the multicopter 100 above the ground or any other suitable reference location. For instance, to determine the height of the multicopter 100 above the ground, the controller 170 uses a reference atmospheric pressure sensed by the barometer 178 while the multicopter 100 is on the ground just before takeoff to determine the height of the ground above sea level. Once the multicopter 100 is airborne, at any given point in time the controller 170 is configured to determine the height of the multicopter 100 above the ground by: (1) using the atmospheric pressure sensed by the barometer 178 to determine the height of the multicopter 100 above sea level; and (2) determining the difference between the height of the multicopter 100 above sea level and the height of the ground above sea level. This is merely one example way of determining the height of the multicopter above a reference point. Any other suitable method may be employed.

The GPS receiver 180 is communicatively connectable with (such as via a suitable wireless protocol) GPS satellites (not shown). The GPS receiver 180 is configured to receive signals from one or more of the GPS satellites, to determine the multicopter's location using those signals, and to transmit signals representing the multicopter's location to the controller 170.

The ESC 184a is electrically connected to and, along with the controller 170, controls the operation of the upper rotor motor 185a. The ESC 184aa is electrically connected to and, along with the controller 170, controls the operation of the lower rotor motor 185aa. The ESC 184b is electrically connected to and, along with the controller 170, controls the operation of the upper rotor motor 185b. The ESC 184bb is electrically connected to and, along with the controller 170, controls the operation of the lower rotor motor 185bb. The ESC 184c is electrically connected to and, along with the controller 170, controls the operation of the upper rotor motor 185c. The ESC 184cc is electrically connected to and, along with the controller 170, controls the operation of the lower rotor motor 185cc. The ESC 184d is electrically connected to and, along with the controller 170, controls the operation of the upper rotor motor 185d. The ESC 184dd is electrically connected to and, along with the controller 170, controls the operation of the lower rotor motor 185dd.

The controller 170 is configured to send rotor motor control signals to the ESCs 184a-184dd to control operation of the rotor motors 185a-185dd in accordance with received control signals and/or control signals the controller 170 generates via any suitable software subroutines. Specifically, the controller 170 receives these control signals and determines how to control the rotor motors in response. The controller 170 determines appropriate rotor motor control signals and transmits the rotor motor control signals to one or more of the ESCs, which causes the ESCs to control their corresponding rotor motors accordingly.

The actuator(s) 174 is operatively connected to the capture assembly 120 to move the capture arm receiver 124 (described below) relative to the hub 110. The actuator(s) 174 may include any suitable components that are sized, shaped, arranged, and configured to move the capture arm receiver 124 relative to the hub 110, such as (but not limited to) an electric motor, a gas-powered motor, a pneumatic component, a hydraulic component, a preloaded spring-actuator, or component that converts impact energy (from the docking maneuver) to full engagement of the two aircraft.

In this embodiment, although not shown in FIG. 1B, one or more lithium-ion batteries (or any other suitable power source(s)) power these components. Specifically, for a given component, the power source may be directly electrically connected to that component to power that component or indirectly electrically connected to that component (e.g., via another component) to power that component. Additionally, communication between two components can be direct or indirect (e.g., another component acts as an intermediary between the two communicating components).

The first, second, third, and fourth rotor arms 130a, 130b, 130c, and 130d, which respectively support the rotors 135a-135dd, are each attached at one end to the hub 110. The first and second rear landing gear 140a and 140b are attached to the other ends of the first and second rotor arms 130a and 130b, respectively. The first and second front landing gear 140c and 140d are attached to the other ends of the third and fourth rotor arms 130c and 130d, respectively.

The first wing engager 150a is connected to and extends between the first rear landing gear 140a and the second front landing gear 140d. Similarly, the second wing engager 150b is connected to and extends between the second rear landing gear 140b and the first front landing gear 140c. The first and second wing engagers 150a and 150b include curved wing engaging surfaces 152a and 152b, respectively, each sized and shaped to engage the upper surface of a wing of the fixed-wing aircraft (as described below). In other embodiments, the wing engagers are attached to the hub and not to the landing gear. In further embodiments, the wing engagers are attached to the hub in addition to being attached to the landing gear. In various embodiments, the wing engages are foldable or retractable.

In other embodiments, the multicopter includes a fuselage engager sized and shaped to engage the fuselage of the fixed-wing aircraft. The multicopter may include any suitable aircraft engager or engages sized, shaped, or otherwise configured to contact any suitable portion of the fixed-wing aircraft after capture.

The capture assembly 120 includes a capture arm receiver 124 including a first arm 126 and a second arm 128. The first and second arms 126 and 128 are connected to one another at one end and extend away from one another so their respective free ends 126a and 128a are spaced apart. The first and second arms 126 and 128 are oriented relative to one another and shaped to form a V-shape or a U-shape and define a tapered capture throat (not labeled) between the first and second arms 126 and 128. The capture throat extends within a plane that is generally parallel to the pitch and roll axes of the multicopter 100 and that is transverse (and in some embodiments, perpendicular) to the axis in which the capture arm of the fixed-wing aircraft lies upon approach during capture, as described below, though other orientations may be used. In other embodiments, the capture throat is not tapered. The capture arm receiver 124 also includes a locking device (not shown), such as a latch, to releasably lock the capture arm of the fixed-wing aircraft within the capture throat (described below).

The capture assembly 120 also includes a capture arm receiver moving assembly (not labeled) connected to the hub 110. The capture arm receiver moving assembly is operably connected to the capture arm receiver 124 to raise and lower the capture arm receiver 124 relative to the hub 110. In this example embodiment, the capture arm receiver moving assembly includes a plurality of attachment members 122a, 122b, and 122c attached to the capture arm receiver 124 and the actuator(s) 174 operably connected to the attachment members 122a, 122b, and 122c to raise or lower the attachment members—and the attached capture arm receiver 124—relative to the hub 110. The capture arm receiver moving assembly may attach the capture arm receiver to the hub in any suitable manner and using any suitable components.

The multicopter 100 may include a variety of additional components that are not shown for simplicity and brevity, such as (but not limited to) one or more voltage regulators, gearing to transfer the output of the rotor motors to the rotors, suitable wiring and harnesses, support structures, and housings.

Figure 2:
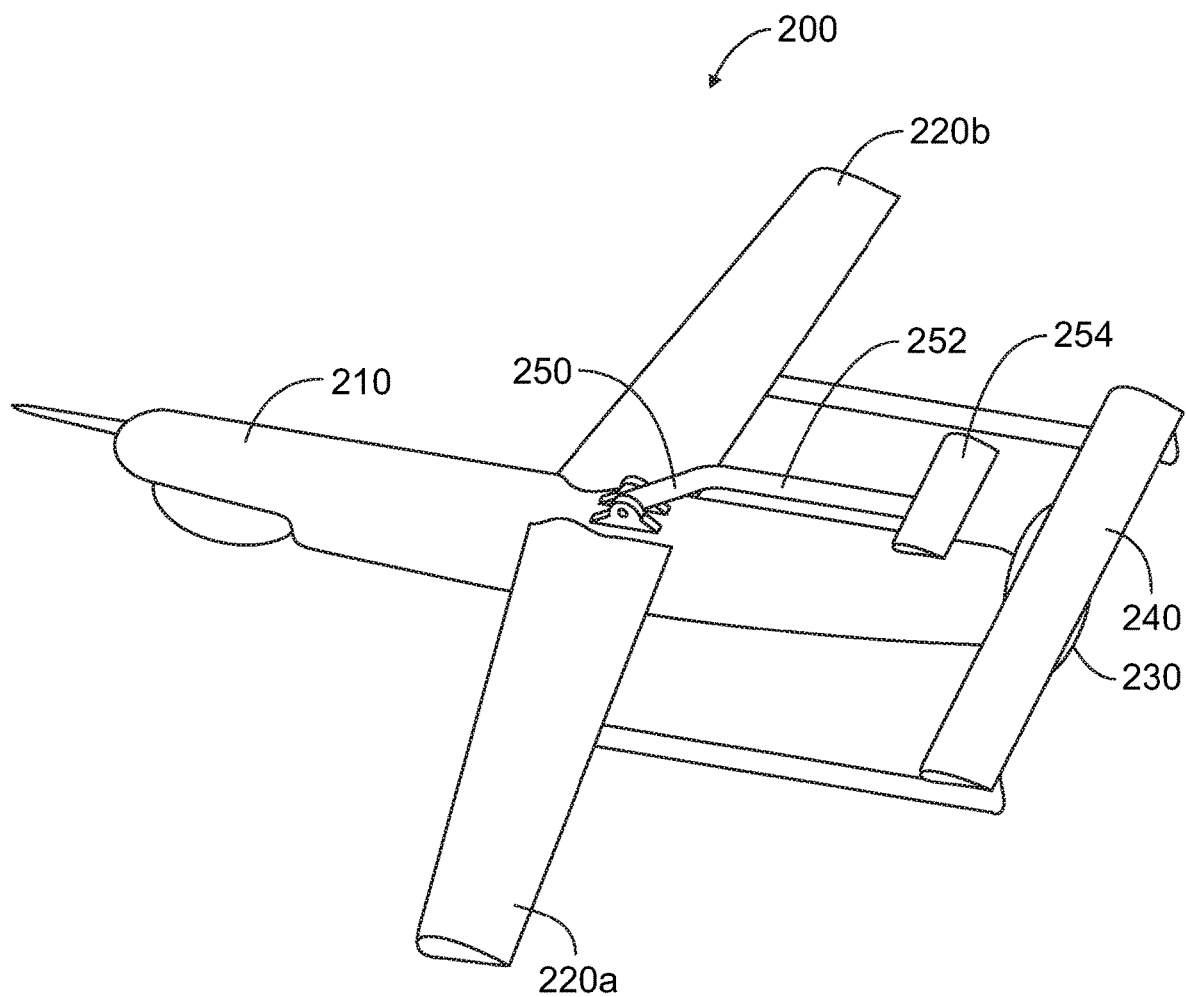
FIG. 2 is a top perspective view of one example embodiment of the fixed-wing aircraft of the present disclosure including a capture-arm assembly.

FIG. 2 shows the fixed-wing aircraft 200. The fixed-wing aircraft 200 includes: (1) a generally cylindrical fuselage 210 having a nose end and a tail end; (2) a first or left wing 220a extending transversely from the fuselage 210; (3) a second or right wing 220b opposite the first wing 220a extending transversely from the fuselage 210; (4) a rotor 230 rotatably attached to the fuselage 210 near the tail end of the fuselage 210; (5) a rear horizontal stabilizer 240 connected to the wings 220a and 220b; and (6) a capture-arm assembly 250 supported by the fuselage 210. This is merely one example fixed-wing aircraft, and any suitable fixed-wing aircraft may be employed.

In this example embodiment, the capture-arm assembly 250 includes a capture arm 252 and a stop 254. Here, the capture arm 252 is pivotably connected to the upper surface of the fuselage 210 vertically above a point near (or slightly forward of or within a designated distance from) the center of gravity of the fixed-wing aircraft 200. The capture arm 252 is oriented such that its longitudinal axis is generally coplanar with the roll and yaw axes of and generally transverse to the pitch axis of the fixed-wing aircraft 200. The stop 254 is connected to the capture arm 252 at or near the free end of the capture arm 252, and is oriented such that its longitudinal axis is generally transverse to the roll and yaw axes of the fixed-wing aircraft 200 and the longitudinal axis of the capture arm 252 and is generally coplanar with the pitch axis of the fixed-wing aircraft 200.

In this example embodiment, the capture arm 252 is rotatable about its pivotable connection to the fuselage 210 from a stowed rotational position in which the capture arm 252 is generally parallel to the fuselage 210, as shown in FIG. 3A, to a capture rotational position in which the capture arm 252 extends generally transversely from the fuselage 210, as shown in 3B (and vice-versa). In this example embodiment, the capture arm 252 includes a suitable rotation control device (not shown)—such as an actuator—that controls the rotational position of the capture arm 252. For instance, the actuator may be operatively coupled to a surface near the end of the capture arm pivotably connected to the fuselage to actuate the capture arm and force it to rotate between the capture rotational position and the stowed rotational position. In the stowed rotational position, the capture arm may rest against the top surface of the horizontal stabilizer.

In another embodiment, a suitable biasing element (such as a spring) biases the capture arm to the capture rotational position. In another embodiment, a suitable biasing element (such as a spring) biases the capture arm to the stowed rotational position.

In another embodiment, the capture-arm assembly includes a locking device to engage the capture arm and lock the capture arm in the capture rotational position and/or the stowed rotational position.

In another embodiment, the capture arm is fixedly connected to the fuselage in the capture rotational position. That is, in this embodiment, the capture arm is not rotatable between the stowed rotational position and the capture rotational position, but is always in the capture rotational position.

In another embodiment, at least part of the capture arm has a knife-blade-shaped cross section that corresponds with the shape of the capture throat formed by the arms of the capture arm receiver. In this embodiment, upon retrieval the capture arm engages the arms of the capture arm receiver to provide an interference or wedge fit, which limits relative yaw motion between the two aircraft.

To retrieve the fixed-wing aircraft 200 from free flight using the multicopter 100, as shown in FIG. 3A, the fixed-wing aircraft 200 approaches the multicopter 100 from behind and below as the multicopter 100 is tracking along a steady course (or in other embodiments, stationkeeping). At this point the capture arm 252 is in the stowed rotational position. As shown in FIG. 3B, before the fixed-wing aircraft 200 reaches the multicopter 100, the rotation control device rotates the capture arm 252 from the stowed rotational position to the capture rotational position. In this position, the capture arm 252 is transverse to the plane in which the capture throat lies.

Figure 3C:
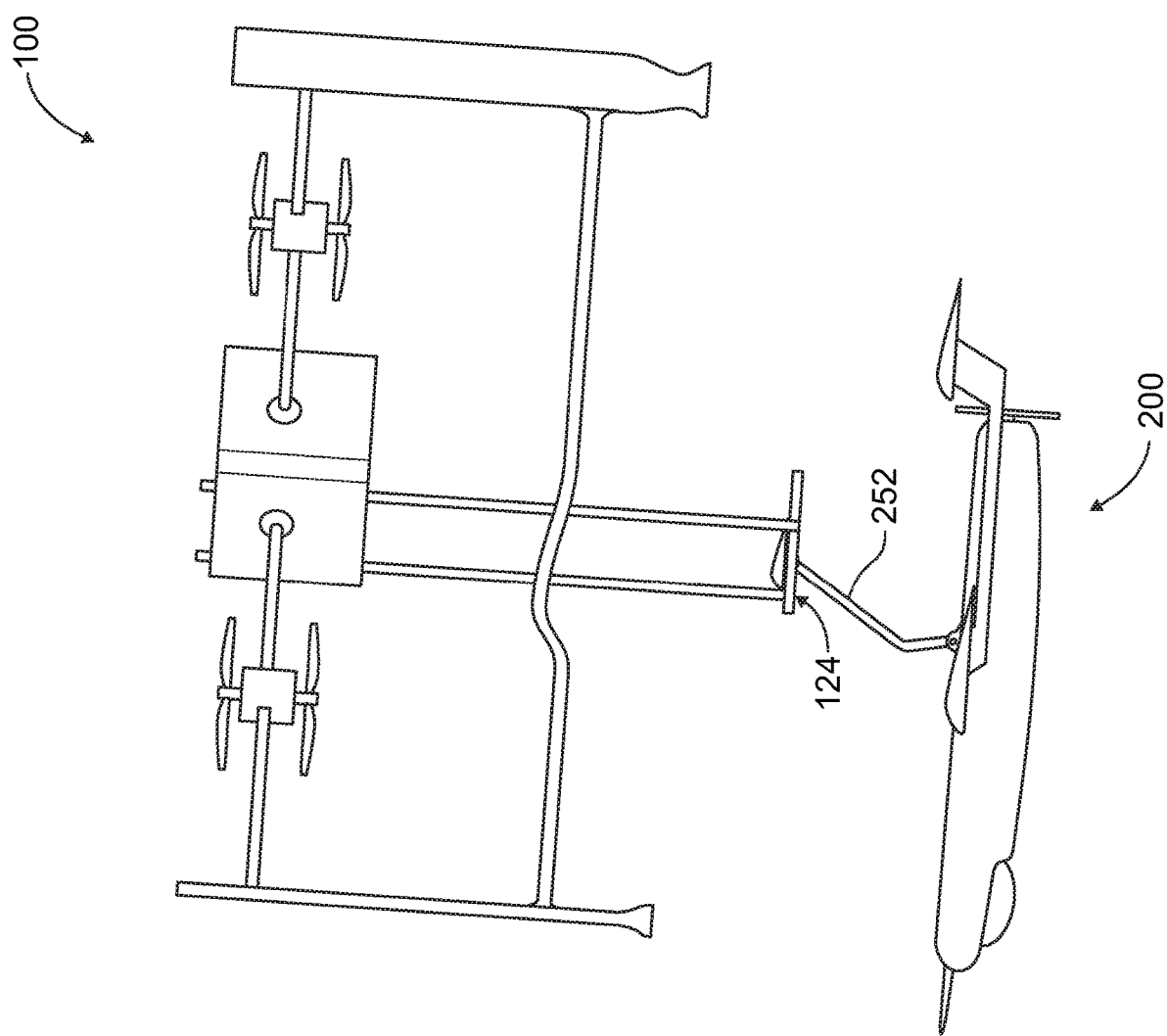

As the fixed-wing aircraft 200 reaches the multicopter 100, the capture arm 252 enters the capture throat of the capture arm receiver 124 formed by the first and second arms 126 and 128, which direct the capture arm 252 into the closed end of the capture throat. The locking device releasably locks the capture arm 252 in place, thereby linking the fixed-wing aircraft 200 and the multicopter 100 to one another via a single linkage, as shown in FIG. 3C. The closed end of the capture throat combined with the locking device and the fact that the width of the stop 254 being larger than the width of the capture throat effective locks the capture arm 252 within the capture throat.

This attachment forces the speeds of the fixed-wing aircraft 200 and the multicopter 100 to suddenly match, and they continue flying as a linked pair. In certain embodiments, to soften the impact when the capture arm 252 reaches and contacts the closed end of the capture throat of the capture arm receiver 124, a rotation control device may enable the capture arm 252 to rotate upon impact.

Figure 3D:
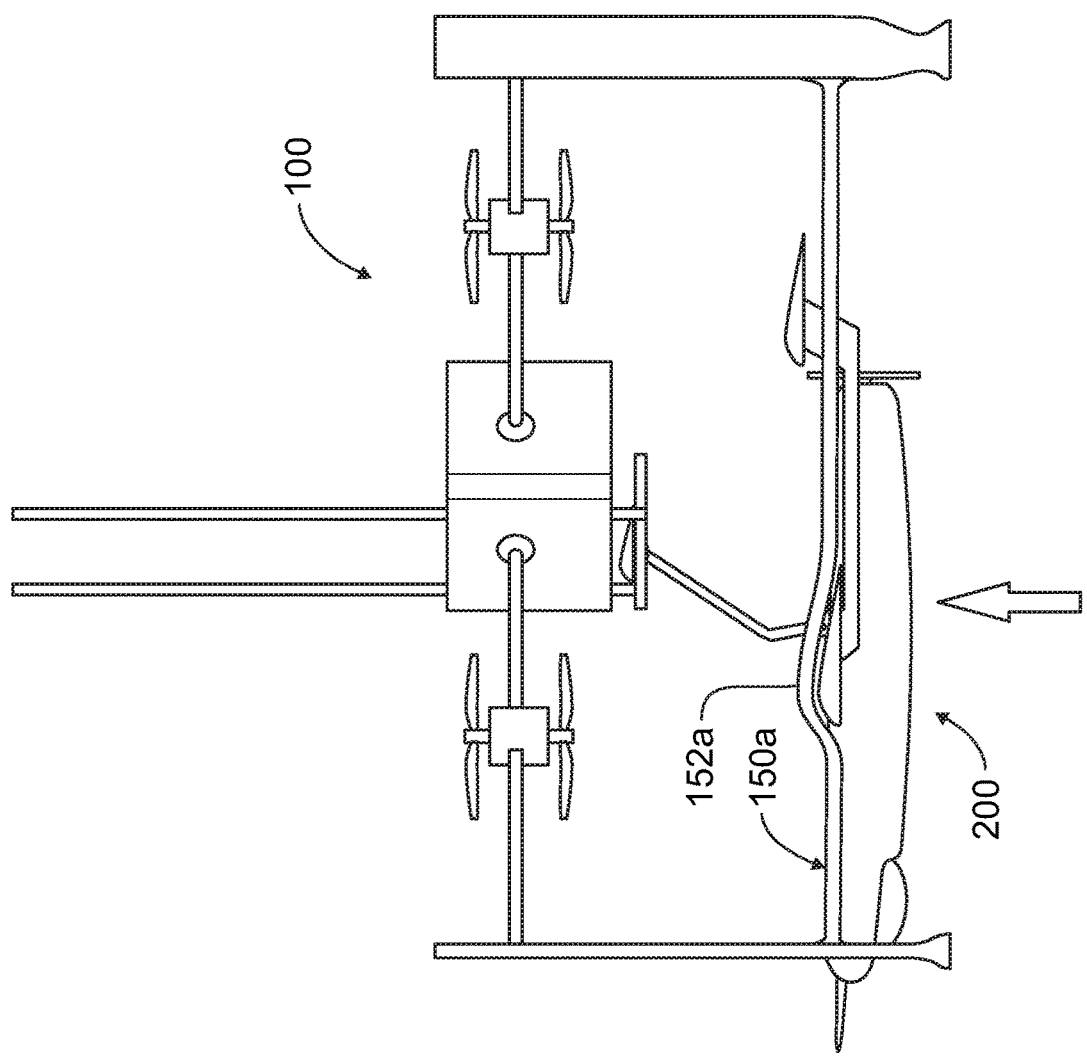

After the capture arm receiver 124 captures the capture arm 252, the capture arm receiver moving assembly raises the capture arm receiver 124 toward the hub 110. As the capture arm receiver 124 moves upward, the capture arms 126 and 128 engage the underside of the stop 254, thereby forcing the stop 254—and the capture arm 252 and the fixed-wing aircraft 200 connected to the stop 254—to move upward toward the hub 110. Once the upper surfaces of the first and second wings 220a and 220 respectively engage the first and second wing engaging surfaces 152a and 152b of the first and second wing engagers 150a and 150b of the multicopter 100, as shown in FIG. 3D, the capture arm receiver moving assembly stops raising the capture arm receiver 124. This engagement at least partially stabilizes the fixed-wing aircraft 200 about its roll, yaw, and pitch axes. The multicopter-assisted aircraft-launch and retrieval system may include sensors that sense when the wings engage the wing engaging surfaces.

Now that the aircraft are linked to one another, the controls and propulsion of the fixed-wing aircraft 200 may be disabled, and the controls and propulsion systems of the multicopter 100 are sufficient to return both the multicopter 100 and the fixed-wing aircraft 200 safely to an airbase for refueling and other services.

Using the same set of hardware, this process is reversed to launch the fixed-wing aircraft 200 into free flight using the multicopter 100. After preflight and engine-start procedures are completed, the multicopter 100 lifts the fixed-wing aircraft 200 from a base or docking station, and establishes a forward speed sufficient for the fixed-wing aircraft 200 to recover from the ensuing drop. At this point, the airspeed is typically below the target airspeed for the fixed-wing aircraft 200, but fast enough for its control surfaces to achieve sufficient pitch, roll, and yaw authority to guide it through a speed-building dive and pull-out. When ready for release, the capture arm receiver moving assembly lowers the capture arm receiver 124 away from the hub 110. When suitably clear from the hub 110, the locking device reverses, ejecting the capture arm 252 of the fixed-wing aircraft 200 from the capture throat of the capture am receiver 124 of the multicopter 100.

In an alternative embodiment (not shown), the multicopter-assisted launch and retrieval system and method includes a helicopter or multicopter with a single vertical sliding surface extending downward, and a fixed-wing aircraft having a swept leading edge surface. The swept surface of the fixed-wing aircraft directs the vertical element inboard or outboard, depending on the sweep direction, and into an engaging element.

This rotorcraft-assisted launch and retrieval system and method remedies the above-described drawbacks of certain known aircraft-launch and/or retrieval systems and methods. Unlike known pneumatic catapult launchers, the multicopter of the multicopter-assisted launch and retrieval system and method remedies can be used to launch the fixed-wing aircraft almost anywhere, including heavily wooded and urban areas. The multicopter is also smaller, lighter, and more agile than pneumatic catapult launchers. Unlike the Bennett aircraft-launch and retrieval system requiring a multi-linkage connection between the rotary-wing aircraft and the fixed-wing aircraft, the multicopter and the fixed-wing aircraft are linked via a single linkage, which reduces complexity, decreases difficulty of launch and retrieval, reduces the likelihood of aircraft damage, and increases safety. Unlike the known aircraft-retrieval system and method including the suspended retrieval rope, the multicopter-assisted launch and retrieval system and method need not be ground anchored and can be used almost anywhere. Additionally, since capture occurs in the air, the multicopter can climb out of a GPS-denied hole to enable GPS-assisted retrieval. And since there is no long, dangling retrieval rope, there is no possibility of the rope snagging nearby obstacles. Further, since the multicopter and the fixed-wing aircraft are tightly linked after capture, the multicopter can gently lower the fixed-wing aircraft to the ground to minimize the potential for damage.

One embodiment of the rotorcraft-assisted fixed-wing aircraft-retrieval system and method of the present disclosure includes a multicopter 1000 including a fixed-wing aircraft capture assembly 3000 sized, shaped, or otherwise configured to capture a fixed-wing aircraft 2000.

The components of the example embodiments of the multicopter 1000 and the fixed-wing aircraft 2000 are generally the same as the multicopter 100 and the fixed-wing aircraft 200 described above, except: (1) the multicopter 1000 includes the capture assembly 3000 instead of the above-described capture assembly 120; and (2) the fixed-wing aircraft 2000 does not include the above-described capture-arm assembly 250.

Although the system and method are described with respect to a multicopter and a fixed-wing aircraft, the multicopter may be replaced with any suitable aircraft (such as any suitable rotorcraft) having powered-lift and vertical launch and recovery capability, and the fixed-wing aircraft may be replaced with any suitable aircraft (such as an aircraft having long-range endurance). Either or both may be manned or unmanned.

As shown in FIGS. 4A to 4D, the capture assembly includes: a multicopter connection section 3100 including first and second multicopter connection arms 3110a and 3110b, a capture section 3200 including first and second wing capture assemblies 3210a and 3210b, and a stabilizing section 3300 including first and second stabilizing arms 3310a and 3310b (not shown but numbered in the text for clarity) connected by a brace 3320.

The first multicopter connection arm 3110a of the multicopter connection section 3100 has a first end 3112a and an opposing second end 3114a. The first multicopter connection arm 3110a includes a stop surface 3115a near the second end 3114a angled to limit the relative rotation of the first multicopter connection arm 3110a and the first wing capture assembly 3210a, as described below. Although not labeled, the second multicopter connection arm 3110b includes like components.

The first wing capture assembly 3210a of the capture section 3200 is generally Y-shaped, and includes a first arm 3211a, a second arm 3214a, and a third arm 3217a. The first and second arms 3211a and 3214a are connected to one another at one end and extend away from one another so their respective other ends 3212a and 3215a are spaced apart to form a V-shape and define a tapered wing-capture throat between the first and second arms 3211a and 3214a. The first arm 3211a includes a stop surface 3213a near its end 3212a angled to limit the relative rotation of the first multicopter connection arm 3110a and the first wing capture assembly 3210a, as described below. The second arm 3214a includes a stop surface 3216a near its end 3215a angled to limit the relative rotation of the first wing capture assembly 3210a and the first stabilizing arm 3310a, as described below. The third arm 3217a extends from the point at which the first and second arms are connected, and terminates in a free end including a foot 3218a. Although not labeled for clarity, the second wing capture assembly 3210b includes like components.

The first stabilizing arm 3310a of the stabilizing section 3300 has a first end 3311a and a second free end (not labeled). The first stabilizing arm 3310a includes a stop surface 3312a near the first end 3311a angled to limit the relative rotation of the first wing capture assembly 3210a and the first stabilizing arm 3310a, as described below. The free end includes a foot 3313a and a stabilizer 3314a. Although not labeled, the second stabilizing arm 3310b includes like components.

The first and second multicopter connection arms 3110a and 3110b are freely pivotably connected at their respective first ends 3112a and 3112b to a mounting element 3050 attached to the hub 1110 of the multicopter 1000. The first arms 3211a and 3211b of the first and second wing capture assemblies 3210a and 3210b are freely pivotably connected at their respective ends 3212a and 3212b to the respective second ends 3114a and 3114b of the first and second multicopter connection arms 3110a and 3110b. The first and second stabilizing arms 3310a and 3310b of the stabilizing section 3300 are freely pivotably connected at their respective first ends 3311a and 3311b to the ends 3215a and 3215b of the second arms 3214a and 3214b of the first and second wing capture assemblies 3210a and 3210b.

Figure 4A:
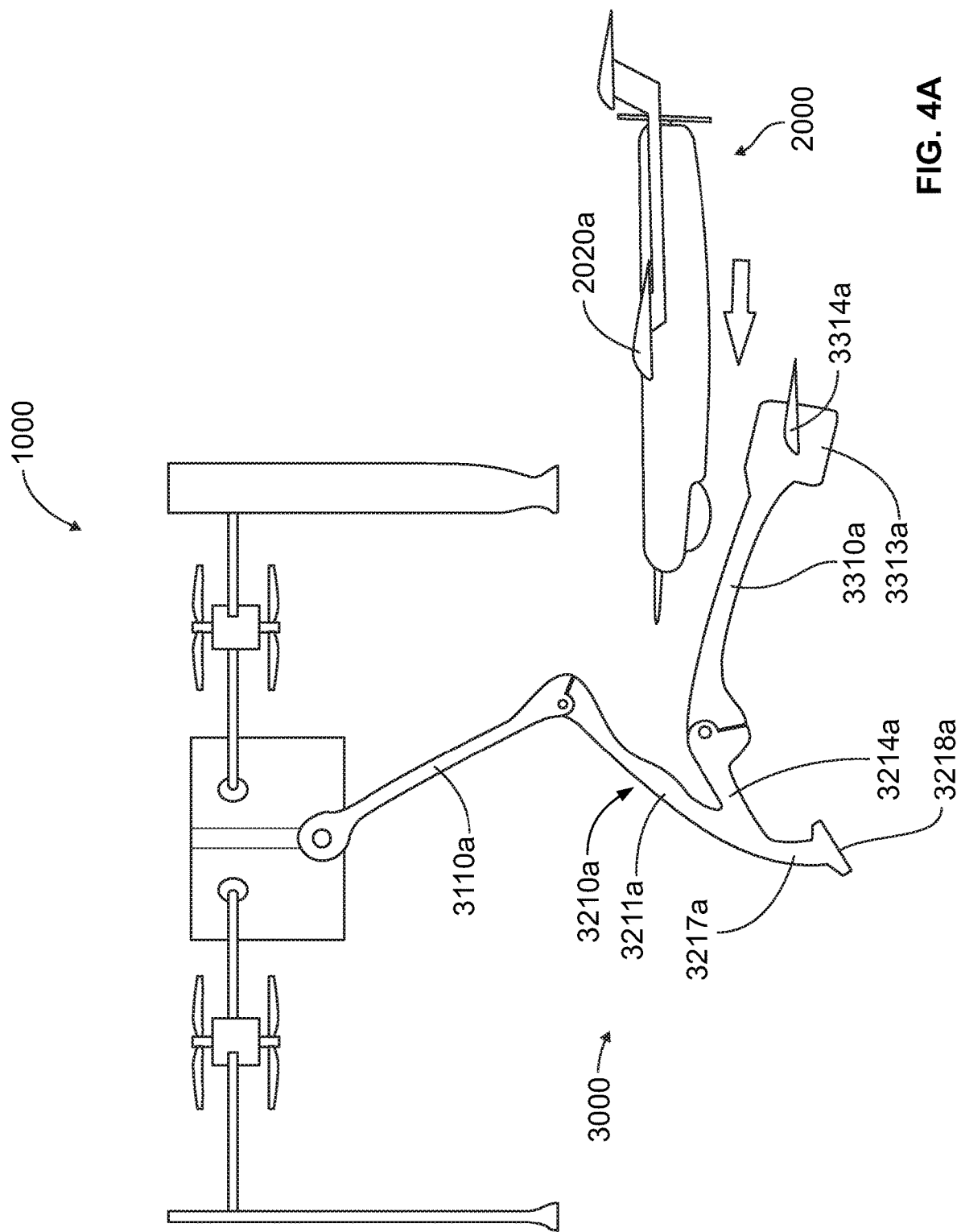
FIGS. 4A, 4B, 4C, and 4D are diagrammatic views showing another example embodiment of the multicopter of the present disclosure including another embodiment of a fixed-wing aircraft capture assembly capturing another example embodiment of the fixed-wing aircraft of the present disclosure.

To retrieve the fixed-wing aircraft 2000 from free flight using the multicopter 1000, as shown in FIG. 4A, the fixed-wing aircraft 2000 approaches the multicopter 1000 from behind and below. At this point, the multicopter 1000 is tracking along a steady course (or in other embodiments, stationkeeping) and, due to gravity, the first and second multicopter connection arms 3110a and 3110b are rotatably positioned relative to the first and second wing capture assemblies 3210a and 3210b such that the stop surfaces 3115a and 3213a contact one another (and prevent further relative rotation in one direction) and the stop surfaces 3115b and 3213b contact one another (and prevent further relative rotation in one direction). Similarly, due to gravity the first and second stabilizing arms 3310a and 3310b are rotatably positioned relative to the first and second wing capture assemblies 3210a and 3210b such that the stop surfaces 3216a and 3312a contact one another (and prevent further relative rotation in one direction) and the stop surfaces 3216b and 3312b contact one another (and prevent further relative rotation in one direction).

The stop surfaces and other components of the capture assembly 3000 are sized, shaped, weighted, and/or positioned such that when the multicopter 1000 is stationkeeping in preparation for retrieval—as in FIG. 4A—the wing-capture throats of the first and second wing capture assemblies 3210a and 3210b are positioned below and extending away from the hub, and in particular are angled downward at a desired angle below horizontal (such as 0 to 90 degrees nose-down).

Figure 4B:
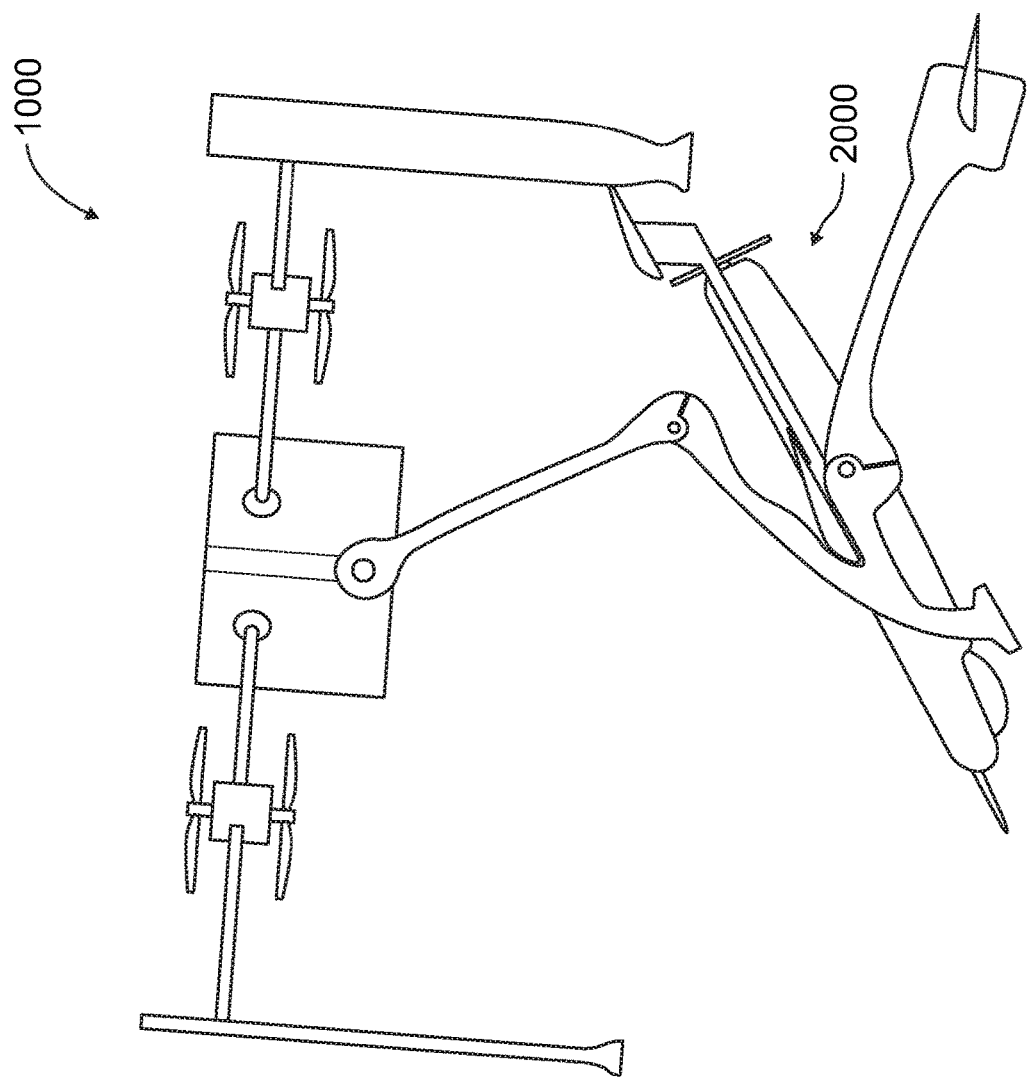

As the fixed-wing aircraft 2000 reaches the multicopter 1000, the wings 2020a and 2020b respectively enter the wing-capture throats of the first and second wing capture assemblies 3210a and 3210b formed by the first and second arms 3211a and 3214a and 3211b and 3214b, respectively. The arms 3211a and 3214a and 3211b and 3214b direct the wings 2020a and 2020b into the closed ends of the respective wing-capture throats. Since the wing-capture throats are angled downward, the fixed-wing aircraft is forced to pitch downward, as shown in FIG. 4B. In this embodiment, gravity maintains the wings in the wing-capture throats, though in other embodiments the aircraft capture assembly may include suitable locking devices to lock the fixed-wing aircraft in place after capture.

At this point, the fixed-wing aircraft 2000 is captured. Now that the aircraft are linked to one another, the controls and propulsion of the fixed-wing aircraft 2000 may be disabled, and the controls and propulsion systems of the multicopter 1000 are sufficient to return both the multicopter 1000 and the fixed-wing aircraft 2000 safely to an airbase for refueling and other services.

Figure 4C:
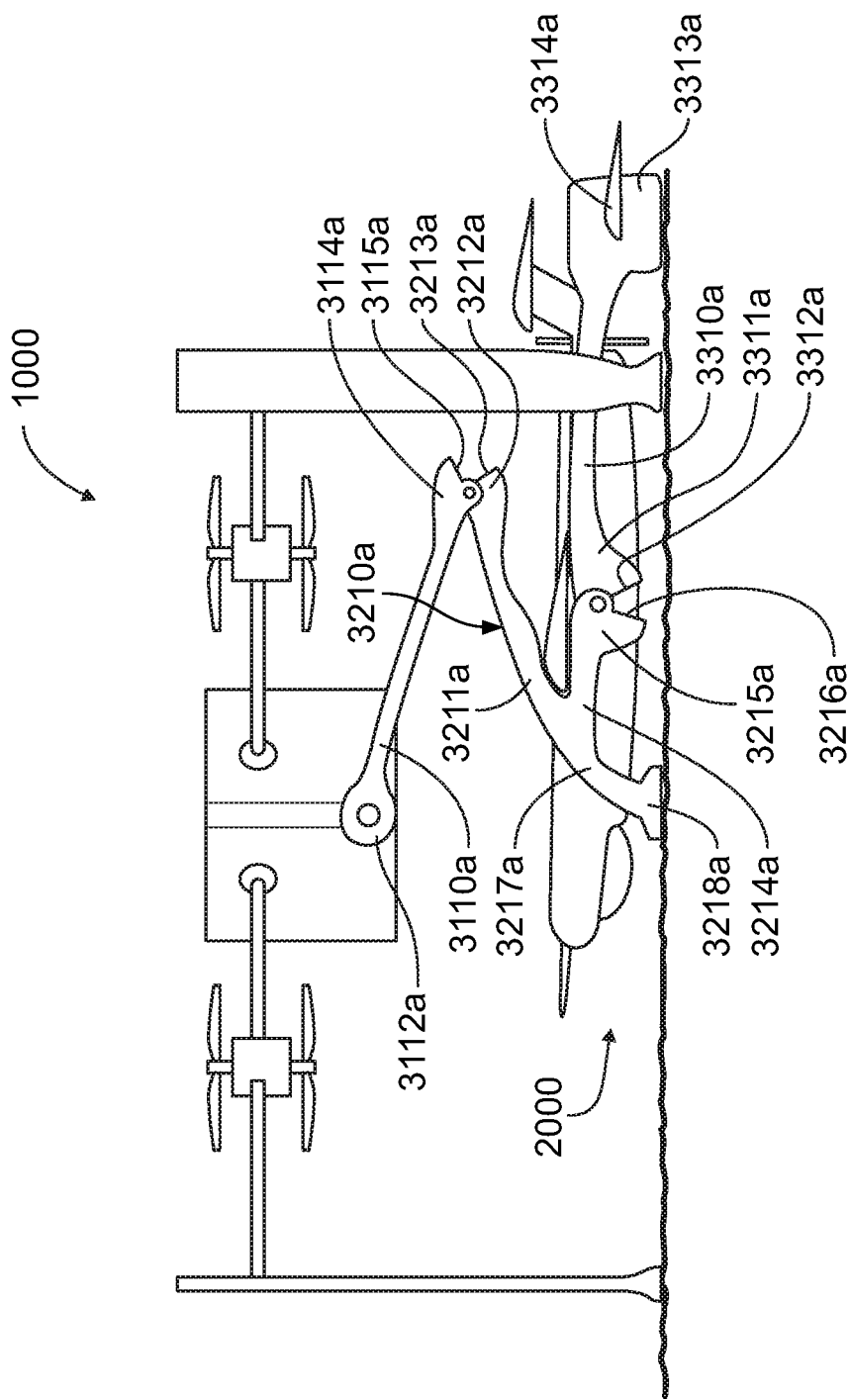
Figure 4D:
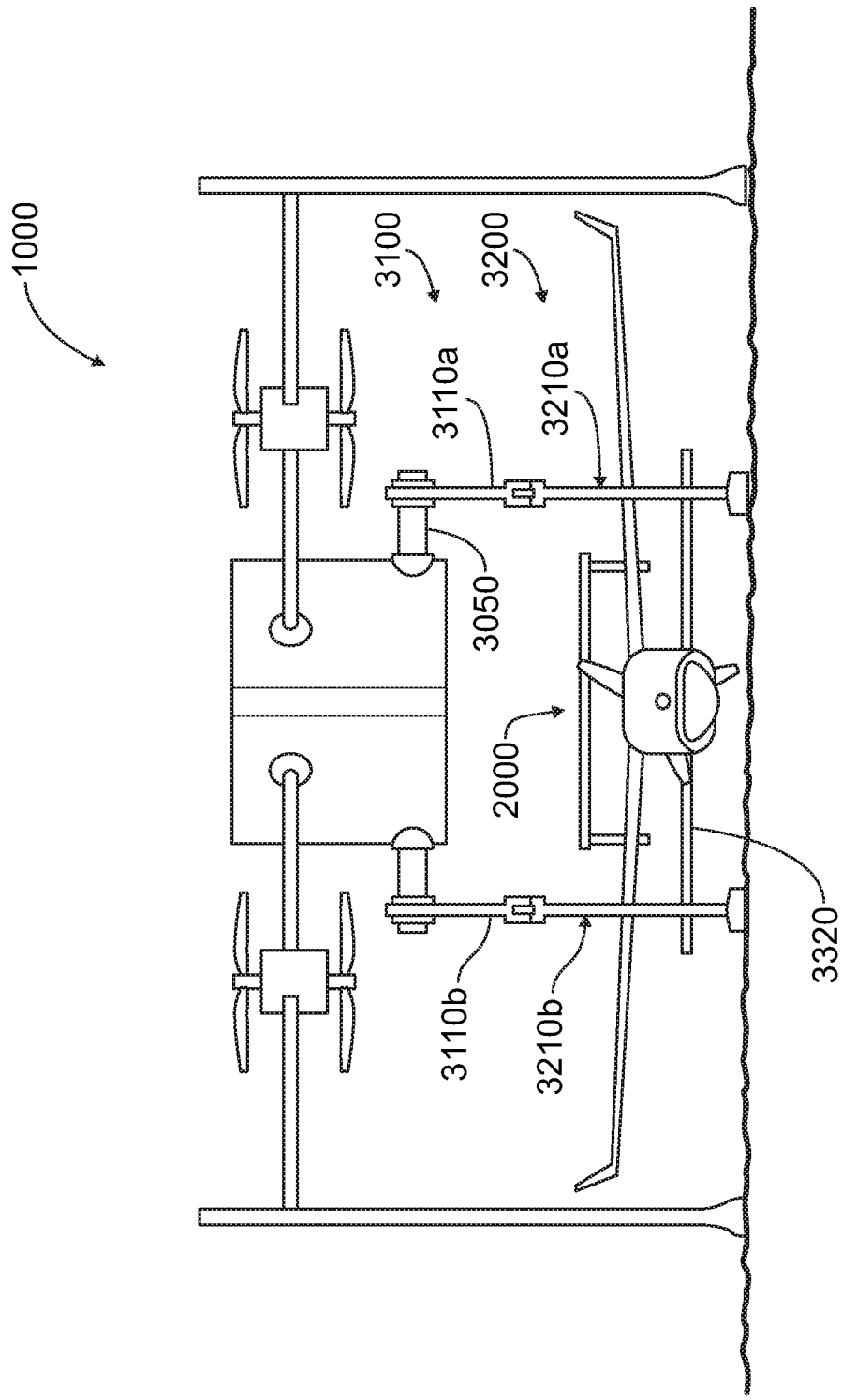

After the wing capture assemblies 3210a and 3210b capture the wings 2020a and 2020b of the fixed-wing aircraft 2000, the multicopter 1000 lands. During landing, the feet 3218a, 3218b, 3313a, and 3313b of the capture assembly 3000 contact the ground and act as additional landing gear. Further, the freely pivoting connections of the aircraft capture assembly 3000 enable the multicopter connection arms 3110a and 3110b, the wing capture assemblies 3210a and 3210b, and the stabilizing arms 3310a and 3310b to rotate towards one another to vertically compact the aircraft capture assembly 3000 within the footprint of the multicopter 1000. FIGS. 4C and 4D show the multicopter 1000, capture assembly 3000, and fixed-wing aircraft 2000 after landing.

In certain embodiments, the aircraft capture assembly 3000 is removable from the multicopter 1000. This enables the multicopter 1000 to perform other tasks without carrying the aircraft capture assembly.

This multicopter-assisted retrieval system and method remedies the above-described drawbacks of certain known aircraft-retrieval systems and methods. Unlike the Bennett aircraft-retrieval system requiring a four-linkage connection between the rotary-wing aircraft and the fixed-wing aircraft, the multicopter and the fixed-wing aircraft are linked via two linkages, which reduces complexity, decreases difficulty of retrieval, reduces the likelihood of aircraft damage, and increases safety. Unlike the known aircraft-retrieval system and method including the suspended retrieval rope, the multicopter-assisted launch and retrieval system and method need not be ground-anchored and can be used almost anywhere. Additionally, since capture occurs in the air, the multicopter can climb out of a GPS-denied hole to enable GPS-assisted retrieval. And since there is no long, dangling retrieval rope, there is no possibility of the rope snagging nearby obstacles. Further, since the multicopter and the fixed-wing aircraft are tightly linked after capture, the multicopter can gently lower the fixed-wing aircraft to the ground to minimize the potential for damage.

Various changes and modifications to the presently preferred embodiments described herein will be apparent to those skilled in the art. These changes and modifications can be made without departing from the spirit and scope of the present subject matter and without diminishing its intended advantages. It is intended that such changes and modifications be covered by the appended claims.

The invention claimed is:

1. A rotorcraft comprising:
a body;
a first rotor arm extending from the body and supporting a first rotor rotatable within a first plane; and
a capture assembly supported by the body and comprising a capture arm receiver defining a capture throat sized to receive a capture arm of a fixed-wing aircraft,
wherein the capture arm receiver defines the capture throat to be approached and engaged by the fixed-wing aircraft from a rear of the rotorcraft, and
wherein the capture arm receiver includes two arms that define the capture throat, and wherein each arm includes a first end and a second end, the two first ends of the arms are joined, and the two second ends of the arms are oriented such that the capture throat is tapered.

2. The rotorcraft of claim 1, further comprising an aircraft engager comprising an aircraft-engaging surface sized and shaped to engage a portion of the fixed-wing aircraft.

3. The rotorcraft of claim 2, wherein the aircraft engager comprises a wing engager and the aircraft-engaging surface includes a wing-engaging surface.

4. The rotorcraft of claim 3, further comprising a second rotor arm extending from the body and supporting a second rotor, a third rotor arm extending from the body and supporting a third rotor, and a fourth rotor arm extending from the body and supporting a fourth rotor.

5. The rotorcraft of claim 4, further comprising a first landing gear connected to the first rotor arm, a second landing gear connected to the second rotor arm, a third landing gear connected to the third rotor arm, and a fourth landing gear connected to the fourth rotor arm, wherein the first wing engager extends between the first and the second landing gear and the second wing engager extends between the third and the fourth landing gear.

6. The rotorcraft of claim 1, wherein the capture assembly further comprises a capture arm receiver moving assembly comprising an actuator operably connected to the capture arm receiver to move the capture arm receiver toward and away from the body.

* * * * *